United States Patent [19]

Schmitt et al.

[11] 4,151,152

[45] Apr. 24, 1979

[54] STABLE FAST-SETTING VARNISHES BASED ON POLYESTERS AND BLOCKED ALIPHATIC DIISOCYANATE

[75] Inventors: Karl Schmitt; Josef Disteldorf, both of Herne; Flexi Schmitt, Herten-Langenbochum, all of Fed. Rep. of Germany

[73] Assignee: Veba-Chemie Aktiengesellschaft, Gelsenkirchen-Buer, Fed. Rep. of Germany

[21] Appl. No.: 810,453

[22] Filed: Jun. 27, 1977

Related U.S. Application Data

[63] Continuation of Ser. No. 648,591, Jan. 12, 1976, which is a continuation of Ser. No. 506,931, Sep. 17, 1974, abandoned.

[30] Foreign Application Priority Data

Sep. 18, 1973 [DE] Fed. Rep. of Germany ....... 2346818

[51] Int. Cl.$^2$ .................. C08G 18/42; C08K 5/10; C08G 18/80
[52] U.S. Cl. .................. 260/33.6 UB; 260/18 TN; 260/29.15 B; 260/31.2 N; 260/32.2; 260/32.8 N; 260/858; 260/859 R; 427/13; 528/45; 528/81
[58] Field of Search .................. 260/75 NK, 77.5 TB, 260/75 NP, 31.2 N, 31.4 R, 32.8 N, 33.6 UB; 427/385; 528/45

[56] References Cited

U.S. PATENT DOCUMENTS

| | | | |
|---|---|---|---|
| 3,554,951 | 1/1971 | Blomeyer et al. | 260/291 |
| 3,803,098 | 4/1974 | Schmitt et al. | 260/75 NK |
| 3,808,160 | 4/1974 | Steinmetz | 260/75 NK |
| 3,819,586 | 6/1974 | Rudolph et al. | 260/77.5 TB |
| 3,822,240 | 7/1974 | Schmitt et al. | 260/75 NK |
| 3,830,785 | 8/1974 | Matsui et al. | 260/77.5 TB |

*Primary Examiner*—H. S. Cockeram
*Attorney, Agent, or Firm*—Sprung, Felfe, Horn, Lynch & Kramer

[57] ABSTRACT

A process for preparing fast setting varnishes for coating preferably metallic materials with highly deformable coatings by thermal treatment at temperatures exceeding 175° C., preferably at 180°–450° C., consisting of a binding agent mixture dissolved in high-boiling varnish solvents and consisting of 50–90 percent by weight of a high-molecular, hydroxyl-group containing polyester on the basis of mainly aromatic dicarboxylic acids and diols and/or triols having 4–12 carbon atoms; and 10–50 percent by weight of adducts on the basis of 3-isocyanato-methyl-3,5,5-trimethylcyclohexylisocyanate blocked with ε-caprolactam; plus, if desired, varnish additives, dyes and/or pigments.

2 Claims, No Drawings

STABLE FAST-SETTING VARNISHES BASED ON POLYESTERS AND BLOCKED ALIPHATIC DIISOCYANATE

This is a continuation of application Ser. No. 648,591, filed Jan. 12, 1976, which in turn is a continuation of application Ser. No. 506,931, filed Sept. 17, 1974, now abandoned.

BACKGROUND

Polyurethane varnishes are superior in a number of characteristics to a great many other varnishes, including reactive varnishes. In particular they are distinguished by high resistance to chemicals, especially acids, by high elasticity combined with great hardness in some cases, and by good resistance to wear.

The prototype of the polyurethane varnishes is the two-component varnish, consisting of synthetic resins containing hydroxyl groups (e.g., polyesters, polyethers, polyacrylates) and an NCO terminal adduct on the basis of diisocyanates. Such a two-component varnish by its very nature has the disadvantage of a limited pot life ranging, as a rule, from 6 to 20 hours.

Another approach to the preparation of polyurethane varnishes is to react resins containing hydroxyl groups (polyesters, polyethers, polyacrylates) with diisocyanates in an OH:NCO ratio of 1:2 or the like, or in any event with an excess of NCO groups. The resulting prepolymers containing NCO groups then set under the influence of atmospheric humidity to form films. To all intents and purposes this is a one-component system, but one which must be protected against the action of moisture. This implies that special precautions must be taken in the manufacture, pigmentation, etc., of these varnishes.

In a number of technical applications, as for example in roller varnishing, where the insensitivity of the system to surrounding influences, such as air and humidity, and constancy of viscosity over long periods of time are important, such systems cannot be used. It has hitherto been necessary to get along without the good characteristics of the polyurethane varnishes in such applications.

It is known that there are a number of substances which react with isocyanates to form chemically neutral substances, which can in turn be cleaved at elevated temperature to form isocyanates again. These blocked products would be ideally suited for the composition of the types of varnishes desired for this kind of application. A number of these products, however, must be rejected because they tend to yellow from the heat during the setting process. Furthermore, one must distinguish between the aromatic isocyanates and the aliphatic or cycloaliphatic isocyanates, since only the latter group of substances assures resistance to light and to weather simultaneously.

Now, if ε-caprolactam is used as the blocking agent, i.e., as the reagent, in order to transform isocyanates to a form that is non-reactive at lower temperatures, no difficulty is encountered in achieving a setting process that is free of yellowing. This cannot be done in practice, of course, since ε-caprolatam blocked isocyanates are incompatible in solvents commonly used in varnishes.

THE INVENTION

It has now surprisingly been found that the difficulties regarding compatibility will not be encountered in fast-setting varnishes for covering preferably metallic materials with highly pliant coatings by heat treatment at temperatures exceeding 175° C. and preferably temperatures of 180° to 450° C., consisting of a binding agent mixture dissolved in high-boiling varnish solvents, if the said mixture consists of 50 to 90%, by weight, of polyesters of great molecular weight containing hydroxyl groups and prepared on the basis of mainly aromatic dicarboxylic acids and a mixture of diols and triols having 4 to 12 carbon atoms, and 10 to 50%, by weight, of ε-caprolactam-blocked adducts of 3-isocyanatomethyl-3,5,5-trimethylcyclohexylisocyanate (also called "isophorone diisocyanate" or "IPDI"), plus, if desired, varnish additives, dyes and/or pigments, it being often advantageous to permit a small percentage, i.e., 0.01 to 5% by weight of free NCO groups in the blocked isocyanate adduct. It is additionally to be found that the IPDI is distinguished from other aliphatic diisocyanates by an outstanding thermal stability.

Inasmuch as sheet metals coated by a roller coating method, especially the coil coating method, are afterwards subjected to deformation in various ways, the elasticity and adhesion of the films must satisfy stringent requirements, and these qualities must be achieved without loss of hardness.

50 to 90%, by weight, of the binding agent of the varnishes of the invention consist of polyesters of high molecular weight containing hydroxyl groups, whose general properties can be described by the following chemical and physical data:

1. Mainly aromatic dicarboxylic acids are used as the acids, the molar ratio of aromatic to aliphatic or cycloaliphatic dicarboxylic acids being greater than 4:1.
2. The required high flexibility is achieved through the glycol components. Usable glycols are products having 3 to 8 carbon atoms, and preferably 4 to 6 carbon atoms, in the chain.
3. The branching is achieved in the conventional manner by means of trifunctional or higher functional polyols, the molar ratio of glycols to higher functional polyols being greater than 1.5:1, preferably 2.5–3.5:1.
4. The hydroxyl number of the polyesters used is to be between 50 and 150 mg KOH/g, preferably between 80 and 125 mg KOH/g.
5. Furthermore, the suitable, hydroxyl-group-containing polyesters are to be described by the glass transformation temperatures which are to be determined by means of differential thermoanalysis. The glass transformation temperature of the claimed hydroxyl polyesters is below +20° C., preferably ranging from −20° to +10° C.

Suitable aromatic or aliphatic and cycloaliphatic polycarboxylic acids (the aromatic polycarboxylic acids can be mono- or polynuclear) are, for example, oxalic acid, succinic acid, adipic acid, sebacic acid, terephthalic acid, methylterephthalic acid, 2,5- and 2,6-dimethylterephthalic acid, chloroterephthalic acid, 2,5-dichloroterephthalic acid, fluoroterephthalic acid, isophthalic acid, trimellitic acid, naphthalinedicarboxylic acid, especially the 1,4-, 1,5-, 2,6- and 2,7-isomers, phenylenediacetic acid, 4-carboxyphenoxyacetic acid, m- and p-terphenyl-4,-4″-dicarboxylic acid, dodecahydrodiphenic acid, hexahydroterephthalic acid, 4,4′-diphenic acid, 2,2′- and 3,3′-dimethyl-4,4′-diphenic acid, 2,2′-dibromo-4,4′-diphenic acid, bis-(4-carboxyphenyl)-methane, 1,1- and 1,2-bis-(4-carboxyphenyl)-ethane, 2,2-bis-(4-carboxyphenyl)-propane, 1,2-bis-(4-carboxyphenoxy)-ethane, bis-4-carboxyphenylether, bis-4-carboxyphenylsulfide, bis-4,carboxyphenylketone, bis-4,carboxyphenylsulfoxide, bis-4-carboxyphenylsulfone, 2,8-dibenzofurandicarboxylic acid, 4,4'-stilbenedicarboxylic acid and octadecahydro-m-terphenyl-4,4"-dicarboxylic acid, etc. Mixtures of the above-named compounds may also be used.

In the preparation of the hydroxyl-group-containing polyesters, diols are used predominantly as the alcohol component. The partial use of other polyols in the stated molar ratios is possible, such as triols for example. Examples of suitable compounds are: ethylene glycol, propylene glycol such as 1,2- and 1,3-propanediol, 2,2-dimethylpropanediol-(1,3), butanediols such as butanediol-(1,4), hexanediols such as hexanediol-(1,6), 2,2,4-trimethylhexanediol-(1,6), 2,4,4-trimethylhexanediol-(1,6), heptanediol-(1,7), octadecane-9, 10-diol-(1,12), thiodiglycol, octadecanediol-(1,18), 2,4-dimethyl-2-propylheptanediol-(1,3), butene- or butinediol-(1,4), diethyleneglycol, triethyleneglycol, cis- or trans-1,4-cyclohexanedimethanol, 1,4-cyclonexanediols, glycerine, hexanetriol-(1,2,6), 1,1,1-trimethylolpropane, 1,1,1-trimethylolethane, pentaerythritol, etc. Mixtures of the above-named compounds may also be used.

In the preparation of the polyester, the polyol is used in such amounts that there will be more than one hydroxyl group equivalent for each carboxyl group equivalent.

The hydroxyl-group-containing polyesters can be prepared in a known and conventional manner. Particularly the following two processes are available.

In the first case the starting product is a dicarboxylic acid free of mineral acid, which is to be refined, if necessary, by recrystallization. The ratio of the equivalents of acid to alcohol depends, of course, on the desired molecule size and on the hydroxyl number that is to be established. Upon the addition of 0.005 to 0.5%, preferably 0.05 to 0.2%, by weight, of a catalyst such as a tin compound, e.g., di-n-butyl tin oxide, di-n-butyl tin diester, etc., or a titanium ester, especially tetraisopropyltitanate, the reaction components are heated in a suitable apparatus under a current of an inert gas such as nitrogen, for example. At approximately 180° C. the first forming of water occurs. The water is removed from the reaction mixture by distillation. Over a period of several hours the reaction temperature is raised to 240° C. The reaction medium remains inhomogenous until shortly before the end of the complete esterification. After about 24 hours the reaction is ended.

In the second process the starting substances are dimethyl esters of the dicarboxylic acid ester, and they are esterified under a current of an inert gas such as nitrogen, for example, with the desired alcohol component. The transesterification catalysts can again be titanium esters, dialkyl tin esters or di-n-butyl tin oxide in concentrations of 0.005 to 0.5 wt.-%. After a temperature of about 120° C. is reached, the first production of methanol occurs. Over a period of several hours the temperature is increased to 220°-230° C. The transesterification is ended after 2 to 24 hours, depending on the mixture used.

Suitable high-boiling varnish solvents are those whose lower boiling point or limit is 110° C. The upper limit of the solvent depends on the conditions of the baking-on process. For this purpose inert high-boiling compounds as well as mixtures thereof can be used. The term "inert" in this connection is considered to mean that the solvents behave in a chemically neutral manner towards the binding agent components under the conditions of mixing and storage. The following are named as examples of suitable pure compounds: aromatic compounds such as toluene, xylenes, cumene, tetrahydronaphthaline, decahydronaphthaline; ketones, such as methylisobutylketone, diisobutylketone, isophorone; esters, such as acetic acid-n-butyl ester, acetic acid-n-hexyl ester, acetic acid isoamyl ester, acetic acid cyclohexyl ester, acetic acid-3,5,5-trimethylcyclohexyl ester, lactic acid-n-butyl ester, ethyl glycol acetate, butyl glycol acetate, and the like.

The amount of the solvent is not critical. It is desirable first to prepare a highly concentrated solution in which the solid content ranges from 50 to 70%. This concentrated solution can be diluted to the concentration specified for the desired application just prior to use.

Agents for the improvement of leveling and gloss are, for example, polyvinyl butyrals, copolymers of n-butyl acrylate and vinyl isobutyl ether, ketone-aldehyde condensation resins, solid silicone resins, silicone oils, or mixtures of zinc soaps of fatty acids and aromatic carboxylic acids.

Common commercial, sterically impeded, polyvalent phenols of high molecular weight have proven valuable as heat stabilizers and antioxidants, but others can also be used.

The quantity of the additives to be used will depend on the individual case and on the desired properties of the product. No general pronouncement can be made in this regard.

The polyester resin, blocked isocyanate, high-boiling varnish solvent, the described varnish additives, and the desired pigment or dye, if any are to be used, are mixed together by known methods below the cleavage temperature of the blocked isocyanate. If incompletely blocked isocyanates are used, it is recommendable to subject the dissolved resins to a thermal treatment between 80° and 160° C. before proceeding with the rest of the varnish formulation. The time of this treatment will amount to from 3 hours to 15 minutes, depending on the established temperature. The solution can be brought to the desired solid content prior to use by the addition of more solvent.

The varnishes of the invention find application in coil coating processes for weather-resistant one-coat and two-coat applications. In modified states they can also be used in the spray painting field by the airless or electrostatic spray method, especially for aluminum.

The preparation and the application of the varnishes of the present invention is illustrated by the following Examples:

EXAMPLE 1

A. Preparation of the Hydroxyl-Group-Containing Polyester

In a six-liter glass flask, 10 moles (1,940 g) of terephthalic acid dimethyl ester were subjected to transesterification with 8 moles (1,280 g) of 2,2,4- and 2,4,4-trimethylhexanediol-1,6 isomer mixture (approx. 40:60) and 3 moles (402 g) of 1,1,1-trimethylolpropane. 0.05 wt.-% of tetraisopropyl titanate was used as transesterification catalyst. The mixture was slowly heated until a uniform melt was obtained, methanol being formed after a temperature of 185° C. was reached. In accordance with the methanol formation, the temperature was increased over a period of 8 hours to a maximum of 215° C. When virtually no more methanol was being produced, the temperature was reduced to 200° C. and the reaction mixture was exposed for about 30 minutes to a vacuum of 1 to 3 mm Hg, whereupon the volatile content was substantially removed from the melt.

| Chemical and physical characteristics of the polyester | |
|---|---|
| Hydroxyl number | 93 – 95 mg KOH/g |
| Acid number | Less than 1 mg KOH/g |
| Molecular weight | 1,600 to 1,700 |
| Glass transformation temperature | −5° C. to +8° C. |

B. Preparation of the ε-Caprolactam-Blocked Diisocyanates

In accordance with the following general specifications, virtually completely capped diisocyanates were produced in a known manner from hexamethylenediisocyanate-1,6 (HDI), 4,4′-diphenylmethanediisocyanate (HMDI) and 3-isocyanatomethyl-3,5,5-trimethylcyclohexylisocyanate (IPDI).

Diisocyanate and ε-caprolactam were mixed in a glass flask in a molar ratio of 1.0:2.0 and this mixture was heated to about 80° C. At about 80° C. the very exothermic reaction started. The reaction mixture was kept below 150° C. by appropriate cooling. After the temperature had diminished to about 110° C. the reaction product was kept for an additional 2 hours at this temperature to complete the reaction.

The reaction products, ε-caprolactam-blocked diisocyanates, are solid resins whose free NCO content is less than 0.3% by weight.

C. Testing

To test the shelf life of these products, stoichiometric mixtures of the hydroxyl polyester with the various ε-caprolactam-blocked diisocyanates were dissolved to form 60 wt.-% solutions in a 2:1 (weight-parts) mixture of Solvesso ® 150 and ethylglycol acetate. This procedure was performed preferably with heating at about 100° C. (Solvesso ® 150 is a mixture of aromatics boiling in a range of 180° to 212° C. and has a flame point of at least 65° C. Supplier: Esso. Recommended as solvent for bake-on varnishes and enamels.)

| | Composition of the Solutions | | | | |
|---|---|---|---|---|---|
| Solution No. | Polyester (see above under A | HDI + cap. | HMDI + cap. | IPDI + cap | Solvent (see above) |
| C 1 | 45.0% | 15% | — | — | 40% |
| C 2 | 42.5% | — | 17.5% | — | 40% |
| C 3 | 43.5% | — | — | 16.5% | 40% |

(All percentages in this table are percentages by weight.)

D. Shelf Life of Solutions C 1, C 2 and C 3

| Solution No. | State after storage at room temperature for | | | | |
|---|---|---|---|---|---|
| | 0 days | 1 day | 1 week | 1 month | 1 year |
| C 1 | clear solution | very turbid solution | much sediment | — | — |
| C 2 | clear solution | clear solution | little sediment | much sediment | — |
| C 3 | clear solution | clear solution | clear solution | clear solution | clear solution |

D. Example of Application

Starting with the solution identified as C 3, a pigmented varnish was formulated as specified below, hardened under "coil coating" conditions and tested.

Formula:
- 67.9 wt.-% of Solution C 3
- 2.0 wt.-% of n-butylglycol acetate
- 30.0 wt.-% of white pigment ($TiO_2$)
- 0.1 wt.-% of silicone oil OL leveling agent, mfr.: Bayer AG 1 mm thick aluminum and steel sheet materials were coated with this varnish and hardened for 75 seconds at 310° to 320° C. in a circulating air drying oven. The tests on a 25 micron thick coating showed the following characteristics:

| Hardness measurements | Pendulum hardness (Konig) | DIN 53157 | 175 sec. |
|---|---|---|---|
| | Impression hardness (Buchholz) | DIN 53153 | 100 |
| | Rocker hardness (Sward) | | 50 |
| | Lead pencil hardness | | 2 H |
| Elasticity | Erichsen cupping | DIN 53156 | >10 mm |
| | Impact (reverse) | | >82 in/lb |
| | T-bend test | | 1 |
| Gloss | Gardner ASTM-D-523 | 20° | 95 |
| | Gardner ASTM-D-523 | 45° | 60 |
| | Gardner ASTM-D-523 | 60° | 95–100 |
| Adhesion | Criss-cross slash test | DIN 53151 | 0 |

EXAMPLE 2

A. Preparation of the hydroxyl-group-containing polyester 7 moles of isophthalic acid (1,163 g), 6 moles of hexanediol-1,6 (709 g) and 2 moles of 1,1,1-trimethylolpropane (268 g) were subjected to esterification in a 4-liter glass flask with the addition of 0.1 wt.-% of n-dibutyl tin oxide. As the temperature increased a homogeneous melt formed and water first began to form at about 195° C. Over a period of 8 hours the temperature was increased to 220° C. and the esterification was carried to completion at this temperature for an additional 6 hours. The acid number was then less than 1 mg KOH/g. After the polyester melt had cooled down to about 200° C., the volatile components were removed under a vacuum of 20 to 30 mm Hg for 30 to 45 minutes.

During the entire reaction a weak current of nitrogen gas was passed through the reaction system.

| Chemical and Physical Characteristics | |
|---|---|
| OH number | 105 mg KOH/g |

-continued

| Acid number | <1 mg KOH/g |
|---|---|
| Molecular weight | 2,400 |
| Glass transformation temp. | −12° C. to +5° C. |

B. Preparation of the ε-Caprolactam-Blocked Diisocyanates

In accordance with the general specifications (cf. Example 1), ε-caprolactam-blocked diisocyanates were prepared which, in contrast to the products described in Example 1, still had a content of free NCO groups after the reaction.

The following list shows the composition of the batches in parts by weight, and the free NCO group contents experimentally determined after the blocking process.

| Number | Diisocyanate | Blocking Agent | Free NCO group content |
|---|---|---|---|
| B 1 | 100 p. HDI | 1211 p. cap. | 2.05 weight-percent |
| B 2 | 1000 p. HMDI | 776 p. cap. | 2.01 weight-percent |
| B 3 | 1000 p. IPDI | 914 p. cap. | 1.98 weight-percent |

C. Preparation of the Varnish Solutions

The polyester described under A and one of the blocked isocyanate adducts described under B were dissolved in a stoichiometric ratio in a solvent mixture of Solvesso ® 150 and ethylglycol acetate (EGA) in a ratio of 2:1 by weight to form 60 weight-percent solutions, and the free NCO groups were made to react. For this purpose the solution was heated to 100° C. and held at that temperature for 1 to 2 hours.

| | Composition of the Solutions | | |
|---|---|---|---|
| Solution | Polyester (see A) | Blocked Diisocyanate (see B) | Solvent |
| C 1 | 45.1% | 14.9% | 40% |
| C 2 | 42.4% | 17.6% | 40% |
| C 3 | 43.5% | 16.5% | 40% |

(All percentages in this table are percentages by weight.)

D. Shelf Life Tests

Specimens of the solutions described under C were stored at temperatures between 5° and 8° C. and samples were taken at certain intervals for testing for turbidity and precipitation.

| | State after storage at 5 to 8° C. for | | | |
|---|---|---|---|---|
| Solution | 0 days | 1 week | 4 weeks | 3 months |
| C 1 | slightly turbid | very turbid | sediment | — |
| C 2 | clear | clear | decidedly turbid | very turbid |
| C 3 | clear | clear | clear | clear |

E. Example of Application

With the solution described under C 3, a varnish was prepared according to the following formula:
Formula:
62.5% solution C 3 (see above)
8.0% solvent mixture: Solvesso ® 150/EGA, 2:1
29.5% white pigment (TiO$_2$)
0.1% silicone oil Aluminum and steel sheets 1 mm thick were coated with this pigmented varnish and hardened for 75 seconds at 310°–320° C. in a circulating air drying oven. The testing of a 25-micron thick coating showed the following:

| Hardness measurements | Pendulum hardness (Konig) | DIN 53157 | 170 sec. |
|---|---|---|---|
| | Impression hardness (Buchholz) | Din 53153 | 111 |
| | Rocker hardness (Sward) | | 45–55 |
| | Lead pencil hardness | | H–2H |
| Elasticity | Erichsen cupping | DIN 53156 | >10 mm |
| | Impact (reverse) | | >82 inch-lb |
| | T-bend test | | 0 |
| Adhesion | Criss-cross slash test | DIN 53151 | 0 |
| Gloss | Gardner ASTM-D-523 | 20° | 70–75 |
| | Gardner ASTM-D-523 | 45° | 50–55 |
| | Gardner ASTM-D-523 | 60° | 85–90 |

EXAMPLES FOR PURPOSES OF COMPARISON

EXAMPLE 3

In the polyester described in Example 2, one of the seven moles of isophthalic acid was replaced with adipic acid. The polyester was thus prepared from 6 moles (1000 g) of isophthalic acid, 1 mole (146 g) of adipic acid, 6 moles (709 g) of hexanediol-1,6 and 2 moles (268 g) of 1,1,1-trimethylolpropane in the manner described in Example 2.

| Chemical and Physical Characteristics | |
|---|---|
| OH number | 117 mg KOH/g |
| Acid number | <1 mg KOH/g |
| Molecular weight | 2000 |
| Glass transformation temp. | −20° to −15° C. |

On the basis of this polyester and the adduct of 3-isocyanatomethyl-3,5,5-trimethylcyclohexylisocyanate (IPDI) described in Example 1, a pigmented varnish of the following formula was prepared and applied:
27.4 wt.-% polyester (see above)
13.4 wt.-% adduct (see Ex. 1)
29.1 wt.-% white pigment (TiO$_2$)
10.0 wt.-% ethyl glycol acetate
20.0 wt.-% Solvesso ® 150
0.1 wt.-% silicone oil OL
Evaluation will be given at the end of Example 5.

EXAMPLE 4

In the polyester described in Example 1, the terephthalic acid was replaced with hexahydroterephthalic acid. 10 moles of hexahydroterephthalic acid dimethyl ester (2000 g), 8 moles (1280 g) of 2,2,4- and 2,4,4-trimethylhexanediol-1,6 isomer mixture (approx. 40:60) and 3 moles (402 g) of 1,1,1-trimethylolpropane were transesterified in the manner described in Example 1.

| Chemical and Physical Characteristics | |
|---|---|
| Hydroxyl number | 98 mg KOH/g |
| Acid number | <1 mg KOH/g |
| Molecular weight | 1600 |
| Glass transformation temp. | −30° C. |

With this polyester and the adduct of isophoronediisocyanate (IPDI) described in Example 1, a pigmented varnish was prepared in accordance with the following formula and applied to 1 mm steel and aluminum sheets and set for 90 seconds at 300° C.:

29.0 wt.-% polyester of Example 4
11.0 wt.-% IPDI adduct (see Example 1)
30.0 wt.-% white pigment (TiO$_2$)
10.0 wt.-% ethyl glycol acetate
20.0 wt.-% Solvesso ® 150
0.1 wt.-% silicone oil OL
See evaluation at end of Example 5.

EXAMPLE 5

6 moles (740 g) of phthalic acid anhydride, 3 moles (438 g) of adipic acid, 2 moles (208 g) of 2,2-dimethyl-propanediol-1,3, 4.5 moles (531 g) of hexanediol-1,6, and 2 moles (268 g) of 1,1,1-trimethylolpropane were subjected to esterification in the usual manner under the catalytic effect of 0.1 wt.-% of di-n-butyl tin oxide.

| Chemical and Physical Characteristics | |
|---|---|
| Hydroxyl number | 76 mg KOH/g |
| Acid number | 3 mg KOH/g |
| Molecular weight | 2700 |
| Glass transf. temp. | −20° to −15° C. |

A varnish was prepared in accordance with the following formula, from this polyester and the adduct of isophoronediisocyanate described in Example 1, for testing purposes:
27.7 wt.-% polyester (see above)
8.7 wt.-% adduct (cf. Example 1)
27.5 wt.-% white pigment (TiO$_2$)
12.0 wt.-% ethyl glycol acetate
24.0 wt.-% Solvesso ® 150
0.1 wt.-% Silicone oil OL.

| Comparative Review of the Most Important Test Results Obtained with Varnishes from Examples 1, 2, 3, 4 and 5 | | | | | |
|---|---|---|---|---|---|
| | Ex. 1 | Ex. 2 | Ex. 3 | Ex. 4 | Ex. 5 |
| Pendulum hardness | 175 sec. | 170 sec. | 140 sec. | 60 sec. | 20 |
| Lead pencil hardness | 2H | H-2H | F | F-H3 | B-HB |
| T-bend test | 1 | 0 | 1-2 | 0-1 | 0 |

EXAMPLE 6

The polyester described in Example 1 was modified by changing the molar ratio of glycol to higher-function alcohols from 2.65:1 to 1:1.

10 moles (1940 g) of terephthalic acid dimethyl ester, 5.85 moles (785 g) of 1,1,1-trimethylolpropane and 5.85 moles (940 g) of 2,2,4- and 2,4,4-trimethylhexanediol-1,6 isomer mixture were subjected, after the addition of 3.7 g of tetraisopropyltitanate, to transesterification in the manner described in Example 1 to form a hydroxyl polyester.

| Chemical and Physical Characteristics | |
|---|---|
| Hydroxyl number | 150 mg KOH/g |
| Acid number | <1 mg KOH/g |
| Molecular weight | 2600 |
| Glass transformation temp. | 14 to 28° C. |

In the following table the most important test results obtained with the varnish described in Example 1 are compared with a varnish prepared on the basis of the polyester described in this example and made in accordance with the following formula:
22.6 wt.-% hydroxyl polyester (see above)
13.8 wt.-% adduct (cf. Example 1)
30.2 wt.-% white pigment (TiO$_2$)
11 wt.-% ethyl glycol acetate
22.2 wt.-% Solvesso ® 150
0.1 wt.-% silicone oil OL

| Varnish formula | Pendulum hardness | Lead Pencil hardness | T-bend Test |
|---|---|---|---|
| Example 6 | 170 sec. | 3H | 4 – 5 |
| Example 1 | 175 sec. | 2H | 1 |

What is claimed is:
1. A liquid varnish consisting essentially of
(I) a high boiling varnish solvent; and
(II) a binder consisting essentially of a mixture of
   A. 50–90% by weight of a hydroxyl group containing polyester having a hydroxyl number between 50 and 150 mgs/KOHg, said hydroxyl group containing polyester prepared by reacting an aromatic dicarboxylic acid, ester or anhydride with a diol and/or triol having 4–12 carbon atoms, the molar ratio of aromatic hydroxyl containing polyester to any polyester having aliphatic or cycloaliphatic dicarboxylic acid residues being greater than 4:1, and
   B. 10–50% by weight of an adduct of 2-isocyanatomethyl-3,5,5-trimethylcyclohex-ylisocyanate blocked with epsilon-caprolactam,
wherein
   (a) the hydroxy containing polyester is prepared by condensation of a reaction mixture consisting essentially of terephthalic acid dimethyl ester, a mixture of 2,2,4- and 2,4,4-trimethylol-hexanediol-1,6 and 1,1,1-trimethylolpropane, the resultant polyester having a molecular weight of 1600 to 1700;
   (b) the solvent comprises ethylglycol acetate and a mixture of aromatic hydrocarbons boiling in a range of 180°–212° C. and having a flame point of at least 65° C.; and
   (c) the liquid varnish remaining clear when stored at room temperature for a period of at least one month.
2. A liquid varnish consisting essentially of
(I) A high boiling varnish solvent; and
(II) A binder consisting essentially of a mixture of
   A. 50–90% by weight of a hydroxyl group containing polyester having a hydroxyl number between 50 and 150 mgs/KOHg, said hydroxyl group containing polyesters prepared by reacting an aromatic dicarboxylic acid, ester or anhydride with a diol and/or triol having 4–12 carbon atoms, the molar ratio of aromatic hydroxyl containing polyester to any polyester having aliphatic or cycloaliphatic dicarboxylic acid residues being greater than 4:1; and
   B. 10–50% by weight of an adduct of 2-isocyanatomethyl-3,5,5-trimethylcyclohex-ylisocyanate blocked with epsilon-caprolactam,
wherein:
   (a) the aromatic hydroxy polyester is prepared by condensation of a reaction mixture consisting essentially of isophthalic acid, hexanediol-1,6 and 1,1,1-trimethylol propane;
   (b) the solvent is a mixture of ethylglycol acetate and a mixture of aromatic hydrocarbons boiling at a range of 180°–212° C. having a flame point of at least 65° C.;
   (c) the liquid varnish remaining clear when stored at a temperature between 5° and 8° C. over a period of at least four weeks.

* * * * *

UNITED STATES PATENT AND TRADEMARK OFFICE
CERTIFICATE OF CORRECTION

PATENT NO. : 4,151,152
DATED : April 24, 1979
INVENTOR(S) : SCHMITT et al.

It is certified that error appears in the above-identified patent and that said Letters Patent are hereby corrected as shown below:

Title Page, Ref. Cited, [56], first reference, "260/291" should read -- 260/29.1 --.

Column 5, line 48, in the title of the table, insert -- ) -- after "under A".

Column 6, line 8, in the title, "D." should read -- E. --.

Column 9, line 39, in the title under Ex. 4, third line down, "H3" should read -- HB --.

Column 10, line 17, Claim 1, "polyester" should read -- polyesters --.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks